United States Patent [19]
Hensel, IV

[11] Patent Number: 5,774,047
[45] Date of Patent: Jun. 30, 1998

[54] TIRE PRESSURE SENSING SYSTEM INCLUDING IMPROVED SWITCH AND LOCATION INDICATOR

[76] Inventor: Frederick William Hensel, IV, 156 North Rd., Butler, Pa. 16001

[21] Appl. No.: 631,463

[22] Filed: Apr. 12, 1996

[51] Int. Cl.⁶ ................................................. B60C 23/00
[52] U.S. Cl. ........................ 340/442; 340/445; 340/447; 342/50
[58] Field of Search ................................. 340/442, 445, 340/447, 446; 73/146.5; 342/50

[56] References Cited

U.S. PATENT DOCUMENTS

| | | | |
|---|---|---|---|
| 3,743,801 | 7/1973 | Brobeck et al. | 200/61.25 |
| 3,757,294 | 9/1973 | Schultz | 340/442 |
| 3,787,806 | 1/1974 | Church | 340/58 |
| 4,071,724 | 1/1978 | Lejeune | 200/61.25 |
| 4,157,530 | 6/1979 | Merz | 340/445 |
| 4,211,901 | 7/1980 | Matsuda et al. | 200/83 |
| 4,334,215 | 6/1982 | Frazier et al. | 340/539 |
| 4,386,247 | 5/1983 | Couat | 200/61.25 |
| 4,517,834 | 5/1985 | Luke | 73/146.5 |
| 4,717,905 | 1/1988 | Morrison, Jr. et al. | 340/58 |
| 4,851,809 | 7/1989 | McAlister | 340/442 |
| 5,025,244 | 6/1991 | Huang | 340/442 |
| 5,109,213 | 4/1992 | Williams | 340/447 |

*Primary Examiner*—Jeffery Hofsass
*Assistant Examiner*—Davetta Woods
*Attorney, Agent, or Firm*—Alan G. Towner; Eckert Seamans Cherin & Mellott, LLC

[57] ABSTRACT

A tire pressure sensing system is disclosed for detecting, transmitting and indicating low tire pressure information to a vehicle operator. One embodiment of the invention includes an improved pressure sensing switch comprising a hermetically sealed bladder and membrane switch. Another embodiment of the present invention includes an improved tire pressure sensing system which automatically communicates low tire pressure information as well as tire location information to the vehicle operator.

11 Claims, 5 Drawing Sheets

TIRE PRESSURE SENSING SYSTEM INCLUDING IMPROVED SWITCH AND LOCATION INDICATOR

BACKGROUND OF THE INVENTION

The present invention is related to a tire pressure sensing system, and more particularly to a system including an improved switch and transmitter for detecting, transmitting and indicating tire pressure information to a vehicle operator.

Various systems are known for sensing and indicating tire pressure. U.S. Pat. Nos. 3,743,801, 3,787,806, 4,071,724, 4,211,901 and 4,386,247 disclose tire pressure sensing switches comprising a metal diaphragm which reacts to tire pressure and which acts as an electrical conductor to open or close a circuit. In U.S. Pat. Nos. 4,071,724, 4,211,901 and 4,386,247, the metal diaphragm switch closes to make an electrical connection when subjected to normal tire pressure, and opens when tire pressure falls below a predetermined level. Such diaphragm switches, which close to form an electrical circuit during normal tire operating pressures, are disadvantageous because they either drain the battery power supply or require an external source of electrical power. Metal diaphragm switches also possess the disadvantage that the diaphragm must act as both a pressure sensor and an electrical conductor. Such competing requirements can result in less than optimum pressure sensing capabilities, calibration difficulties and increased cost.

U.S. Pat. Nos. 4,851,809 and 5,025,244 disclose tire pressure indicators that are mounted through a tire wall or onto a tire valve. The indicators have a light bulb that turns on when tire pressure is low. While such indicators give a visual indication when tire pressure falls below a predetermined value, manual inspection of each tire is required. Furthermore, such indicators can be difficult to install and can result in pressure leaks because they extend from the pressurized interior to the exterior of the tire.

U.S. Pat. Nos. 4,334,215, 4,717,905 and 5,109,213 disclose tire pressure monitors including transmitters and receivers which are used to communicate tire pressure information to the operator of a vehicle. These systems incorporate a separate transmitter mounted in each tire having a unique transmission frequency. While such systems can inform a vehicle operator that the pressure in a tire has fallen below a certain level, the operator cannot automatically tell the location of the tire. For example, for a four-wheeled vehicle system as disclosed in U.S. Pat. No. 5,109,213, each wheel must be initially assigned a different wheel number 1 through 4 by the user, and each pressure sensing unit must be separately set to provide information representative of the wheel number to be transmitted and displayed. In addition to being cumbersome, such systems have the disadvantage that it is easy to lose track of which tire is mounted at which location. For example, when vehicle tires are rotated to different positions on the vehicle, e.g., front-to-back, criss-cross, etc., conventional pressure monitoring systems cannot automatically track the actual location of each tire.

SUMMARY OF THE INVENTION

An object of the present invention is to provide a system for sensing, transmitting and indicating tire pressure and location information to a vehicle operator. The system may include tire pressure sensors mounted in each tire for transmitting tire pressure information to a receiver. The receiver preferably includes means for identifying the location of each tire. The system automatically informs the vehicle operator of the location of any tire that falls below a predetermined pressure level.

Another object of the present invention is to provide an improved pressure responsive switch including a hermetically sealed bladder, a membrane switch communicating with the bladder, and electrical contacts which close the switch when pressure outside the bladder falls below a predetermined level. The pressure responsive switch may be installed within a tire for sensing low tire pressure, and may be adjusted to close at any desired pressure level.

A further object of the present invention is to provide a tire-mounted pressure sensor for sensing low tire pressure. The sensor transmits a low pressure signal when tire pressure falls below a predetermined level. The sensor is preferably fastened within the pressurized interior of the tire.

These and other objects of the present invention will become apparent from the following description.

DETAILED DESCRIPTION OF THE PREFERRED EMBODIMENTS

Figure 1:
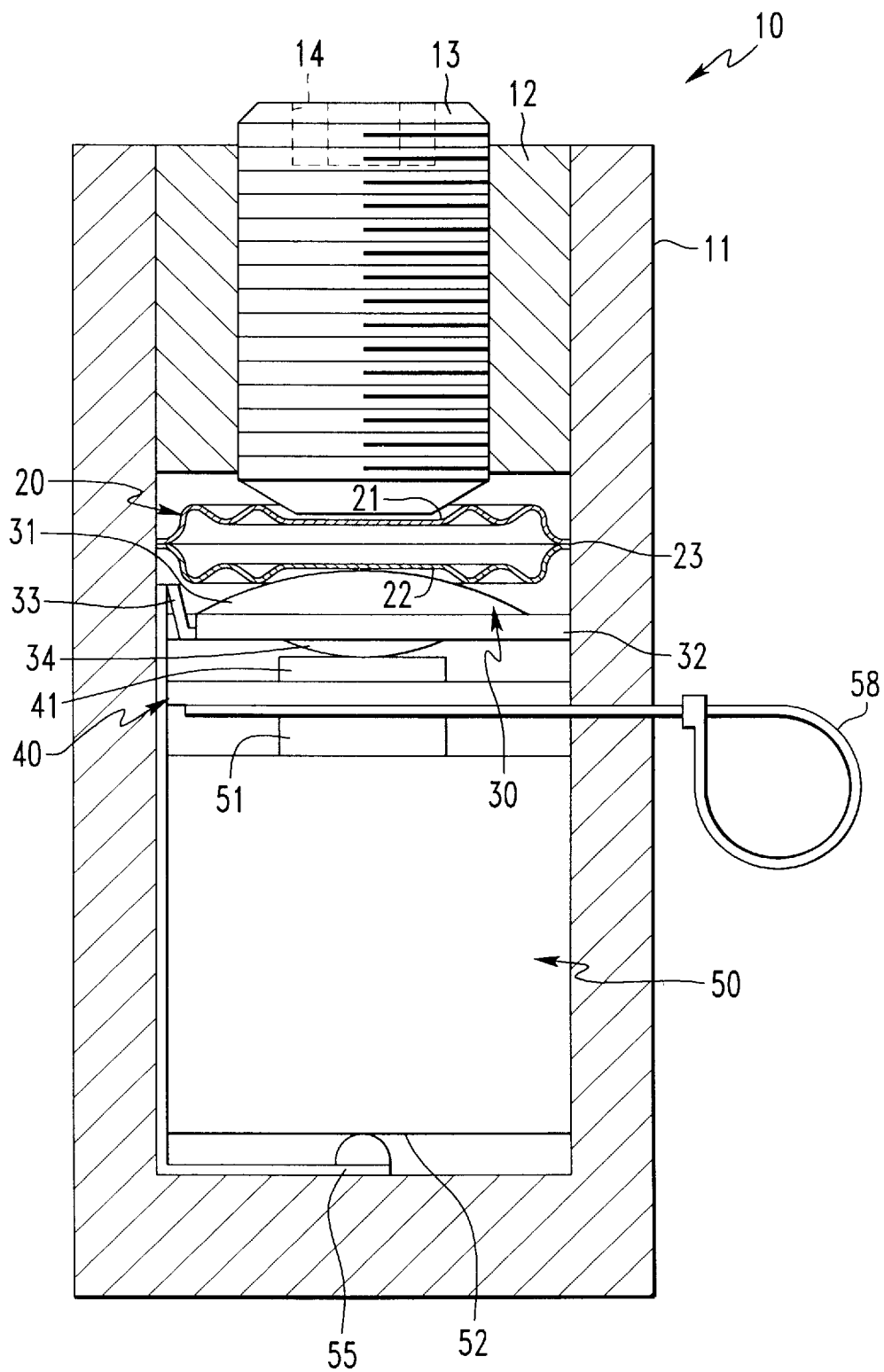
FIG. 1 is a cut-away side view of a pressure sensing assembly in accordance with an embodiment of the present invention including an adjustable pressure sensitive bladder, a membrane switch, a transmitter and a power source.
Figure 2:
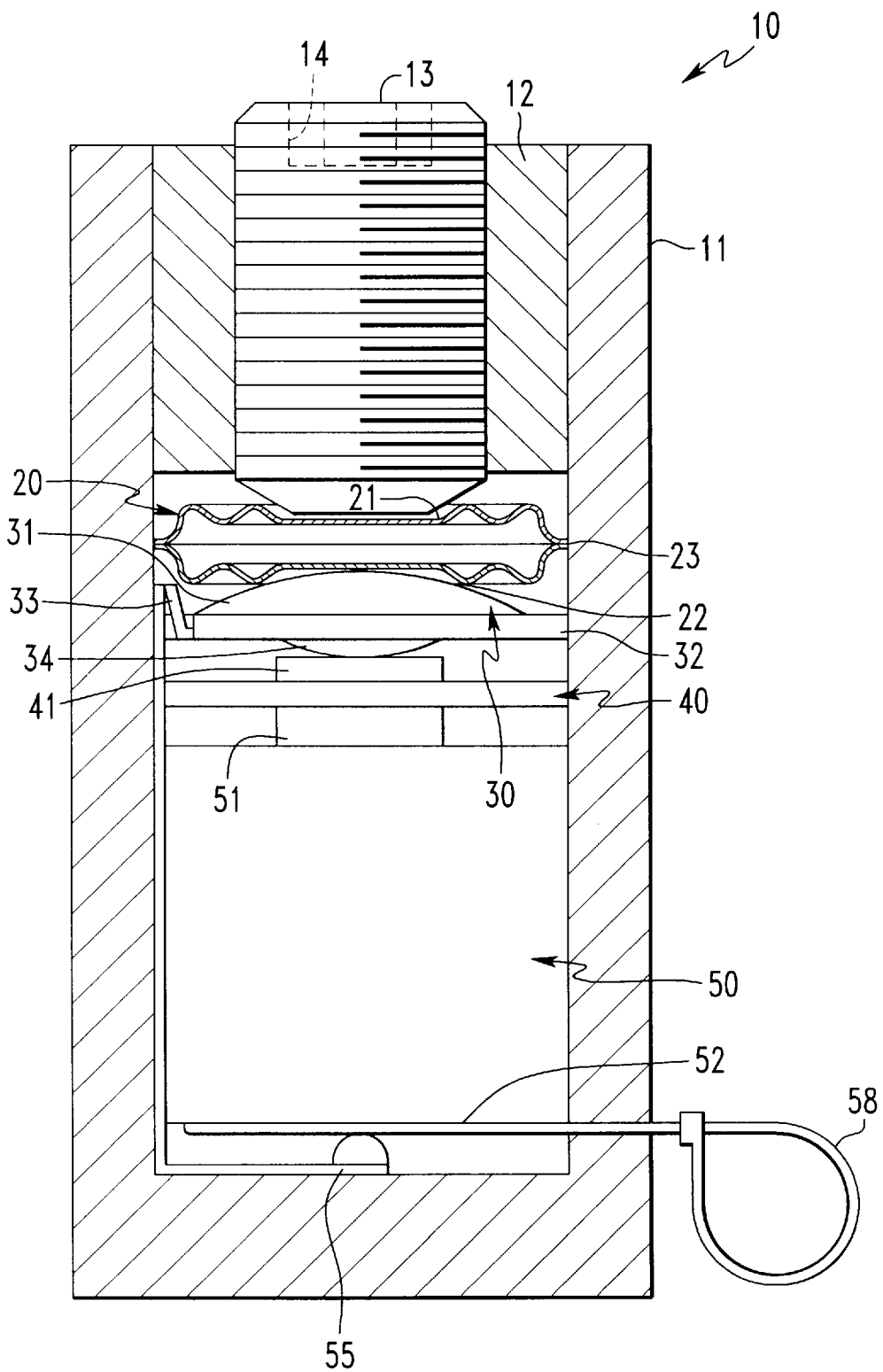
FIG. 2 is a cut-away side view of a pressure sensing assembly in accordance with another embodiment of the present invention.
Figure 3:
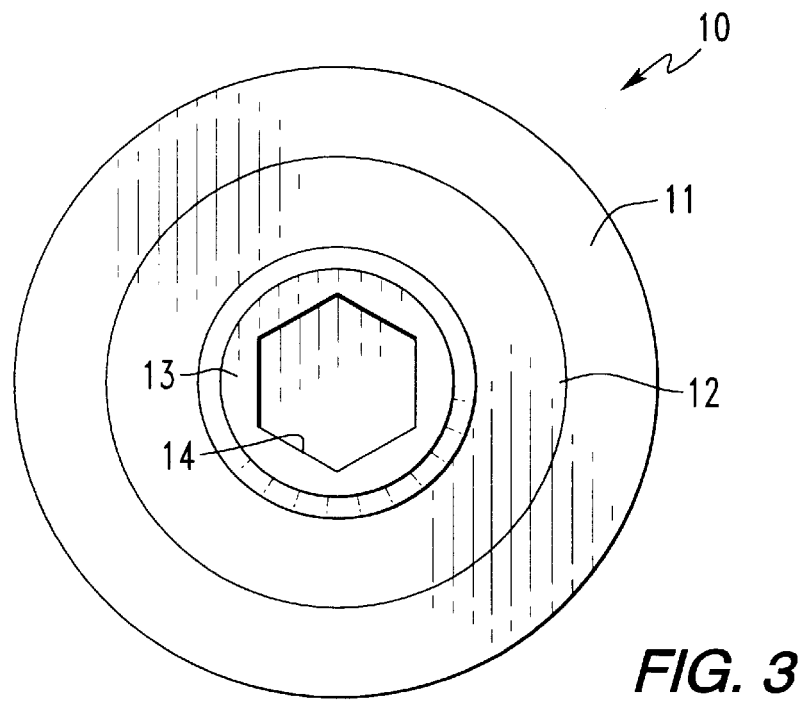
FIG. 3 is an end view of the assembly of FIG. 1.
Figure 4:
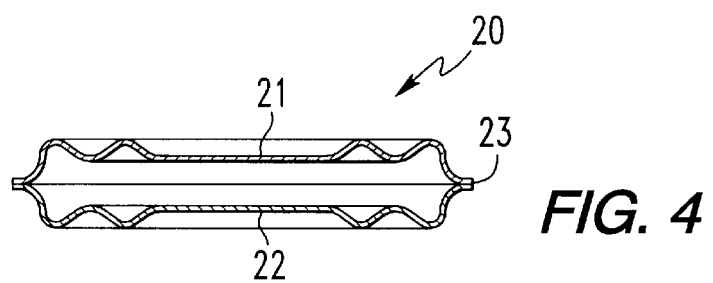
FIG. 4 is a side view and FIG. 5 is an end view of a pressure sensitive bladder similar to that shown in FIG. 1.
Figure 5:
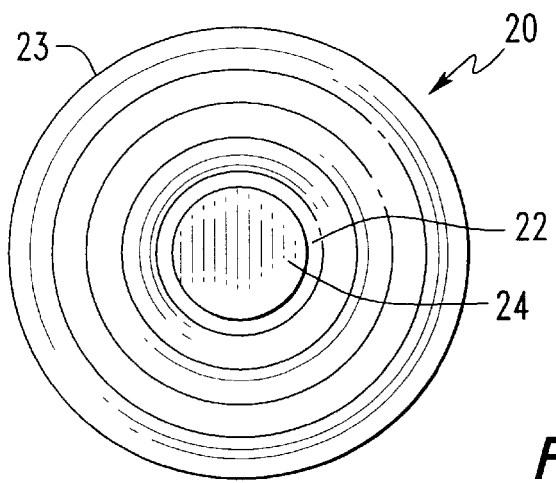
Figure 6:
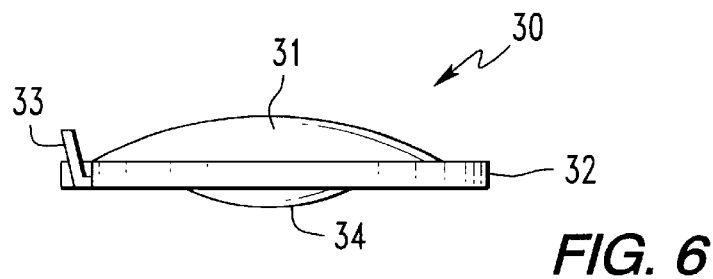
FIG. 6 is a side view and FIG. 7 is an end view of a membrane switch similar to that shown in FIG. 1.
Figure 7:
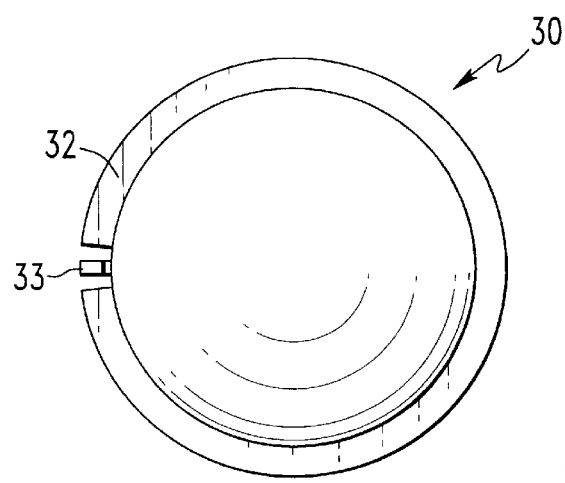
Figure 8:
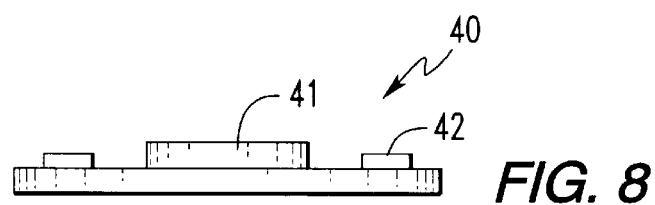
FIG. 8 is a side view and FIG. 9 is a partially schematic end view of a transmitter similar to that shown in FIG. 1.

Referring to the drawings, wherein like reference numbers represent like elements throughout several figures, FIG. 1 shows a side cut-away view and FIG. 3 shows an end view of a switch assembly 10 in accordance with the present invention. The assembly 10 includes a generally cylindrical outer casing 11 having a circular opening into which an annular cap 12 is inserted. The casing 11 and cap 12 may be connected by any suitable fastening means such as adhesives, fusion, welding, bolts, rivets, and the like. The casing 11 and cap 12 may be made from any suitable material, with plastic such as PVDF being preferred due to its durability, ease of injection molding and relatively low cost. An adjusting screw 13 is installed in a tapped opening of the cap 12. The adjusting screw 13 is provided with a hexagonal opening 14 adapted for receiving the head of a wrench. The adjusting screw 13, which is preferably made from metal such as steel, is used to adjust the pressure sensitivity of the switch assembly, as more fully described below.

As shown in FIGS. 1, 2, 4 and 5, a generally disk shaped, hermetically sealed bladder 20 is disposed within the interior of the case 11. The bladder 20 includes a face 21 in contact with the adjusting screw 13, and another face 22 having a raised tab 24, shown in FIG. 4, in contact with a membrane switch 30. The bladder 20 has an annular rib 23 around its circumference which contacts the interior cylindrical wall of the case 11. The bladder 20 may be made from any suitable material that is substantially gas impermeable including metal such as steel, stainless steel, copper and bronze, plastic such as PVDF and PB, and reinforced composites. As discussed more fully below, the gas pressure in the interior volume of the bladder 20 may be set at any desired level including atmospheric pressure, sub-atmospheric pressure or super-atmospheric pressure.

A membrane switch 30 having a resilient dome 31 is located adjacent to the bladder 20 in the interior of the case 11. As shown in FIGS. 1, 2, 6 and 7, the membrane switch 30 includes a base defining an annular rib 32 which contacts the interior of the case 11 and serves to center the membrane switch within the case. The membrane switch 30 includes first and second electrical contacts 33 and 34. The resilient dome 31 of the membrane switch may be made from any suitable material such as plastic, or plastic reinforced with metal. The annular rim 32 of the membrane switch may be made from any suitable material such as reinforced plastic.

Figure 9:
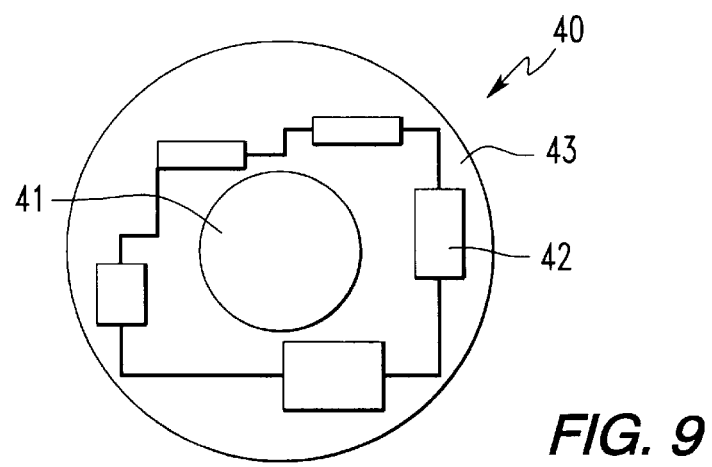

As shown in FIGS. 1, 2, 8 and 9, a generally disk shaped transmitter 40 is located within the case 11 having a first electrical contact 41 in contact with the electrical contact 34 of the membrane switch. The transmitter 40 has a second flush-mounted electrical contact (not shown) on the opposite side from the first electrical contact 41. The transmitter preferably comprises a commercially available circuit design 42, as schematically shown in FIG. 9, fitted to a disk shaped circuit board 43 that is adapted for installation in the case 11. The transmitter preferably generates a low power, pulsed radio frequency signal.

A generally cylindrical battery 50 including a first electrical contact 51 contacts the flush-mounted electrical contact of the transmitter 40. The battery 50 is preferably a long life battery such as a conventional lithium battery or the like. The battery 50 includes a second electrical contact 52 which is in contact with a contact blade 55 which, in turn, is in contact with the electrical connector 33 of the membrane switch 30.

In the embodiment shown in FIG. 1, a pin 58 is inserted through a hole in the case 11 and separates the transmitter 40 and the battery 50 from electrical contact. When the pin 58 is pulled out from the case 11, electrical contact is made between the transmitter 40 and the battery 50. In this manner the pin 58 may be removed just before installation in order to extend the life of the battery 50. In addition, removal of the pin 58 creates an air passageway to the interior of the case 11 which equalizes the pressure inside and outside the case. The embodiment shown in FIG. 2 operates in a similar manner, except the pin 58 is located between the bottom of the battery 50 and the contact blade 55.

Figure 10:
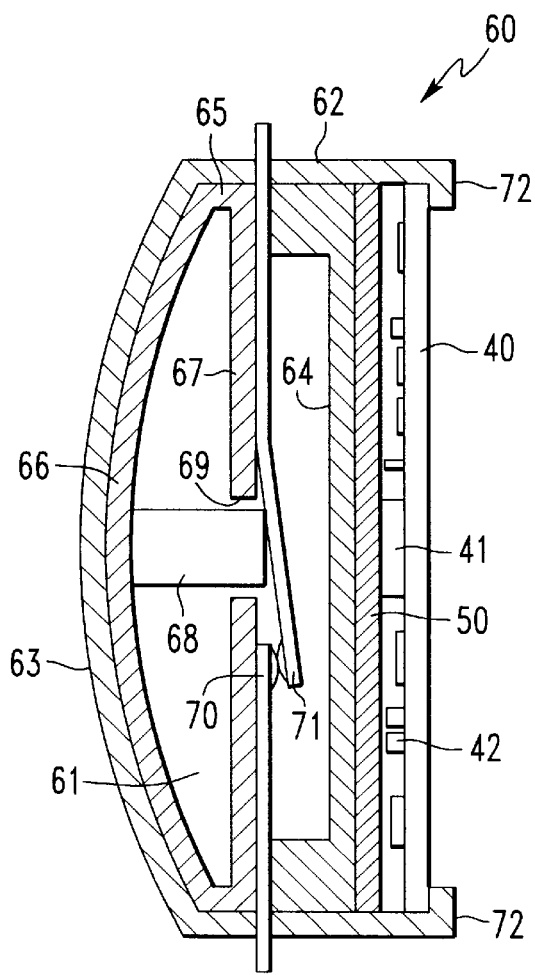
FIG. 10 is a cross-sectional side view of a membrane switch in accordance with another embodiment of the present invention.

FIG. 10 is a cross-sectional view of an integral hermetically sealed bladder and membrane switch 60 in accordance with an alternative embodiment of the present invention. The switch 60 includes a generally disk shaped, hermetically sealed casing 62 defining a sealed chamber 61. The sealed casing 62 includes a curved face 63 which conforms to the curved face of a resilient dome 66 which forms part of a membrane switch 65. The sealed casing 62 also includes a flat portion 64 which forms one wall of the sealed chamber 61. The membrane switch 65 further includes a flat base portion 67 having a central hole 69. A plunger 68 is attached to the resilient dome 66 and extends through the central hole 69 in the base portion 67. A first electrical contact 70 is located on the base portion 67 of the membrane switch 65 and extends through a sealed opening in the sealed casing 62. A second electrical contact 71 is resiliently attached to the base portion 67 and contacts the plunger 68. The second electrical contact also extends through a sealed opening in the sealed casing 62.

The sealed casing 62 includes a plurality of retainer tabs 72 which serve to secure a transmitter 40 and battery 50 to the casing 62. An electrical circuit (not shown) is formed between the electrical contacts 70 and 71 and the transmitter 40 and battery 50, such that closing of the contacts 70 and 71 as shown in FIG. 10 causes the transmitter 40 to be activated.

In FIG. 10, the membrane switch 60 is shown in the closed position wherein electrical contacts 70 and 71 form a closed circuit. In the closed position shown in FIG. 10, the resilient dome 66 is bowed out toward the left as a result of a relatively low pressure surrounding the switch 60. Upon an increase in external pressure above a predetermined level, the resilient dome 66 would move toward the right in FIG. 10, pushing the plunger 68 against the electrical contact 71 to open the switch. The switch 60 shown in FIG. 10 thus performs as both a hermetically sealed bladder and a membrane switch in accordance with one embodiment of the present invention.

In operation, each switch assembly of the present invention may be adjusted to a desired predetermined pressure level. For example, the pressure level could be set at 30 psi for standard passenger automobiles, 60 psi for medium duty trucks and 80 psi for tractor-trailers. Pressure adjustment may be accomplished, for example, in the assembly shown in FIG. 1 by removing the pin 58 from the case 11 and adjusting the force of the adjusting screw 13 against the face 21 of the hermetically sealed bladder 20. Thus, the assembly 10 may be set to a lower pressure sensing level by moving the adjusting screw 13 upward into the casing 11 as shown in FIG. 1, or may be set to a higher pressure sensing level by moving the adjusting screw 13 downward in FIG. 1. Alternatively, the pressure sensing level of the assembly 10 may be adjusted by using hermetically sealed bladders having different internal pressures.

After the pin 58 is removed and the desired pressure sensing level is set, each assembly 10 is installed in the interior of a tire. While the assembly could be loosely placed inside the tire, it is preferred to fasten the switch assembly to the inside of the tire by suitable means such as adhesives or the like to maintain proper tire balance. During normal tire operating pressures, the hermetically sealed bladder and membrane switch is in the open position, thereby preventing undesirable draining of the battery power source. However, if tire pressure falls below a preselected level, the sealed bladder and membrane switch closes, resulting in the transmission of a low pressure signal to the receiver.

In accordance with a preferred embodiment of the present invention, a switch assembly of the present invention is placed in each tire of a vehicle. For purposes of illustration, the use of the assemblies in a four-wheeled vehicle is described herein. However, it is to be understood that the system of the present invention may be used with any type of multiple-wheel vehicle, including vehicles with 2 to 18 or more wheels.

Figure 11:
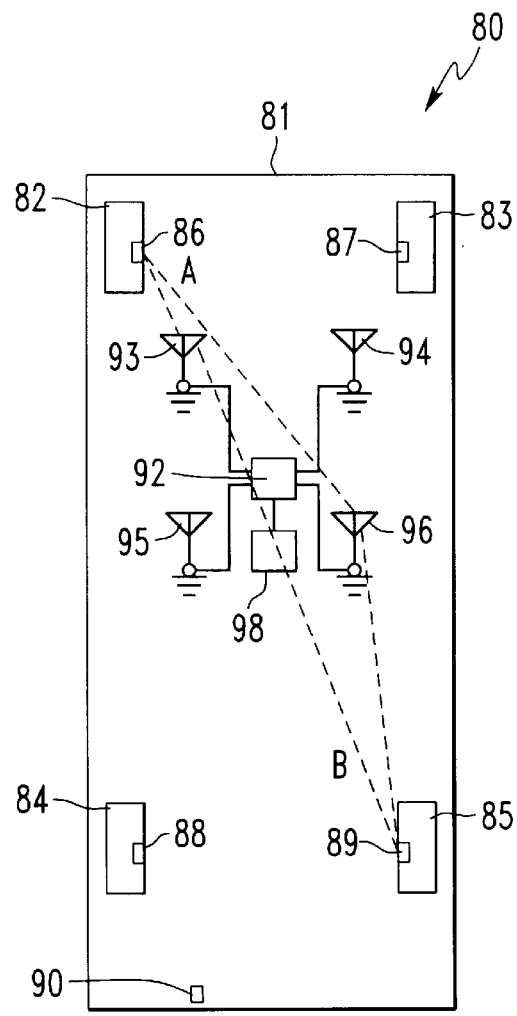
FIG. 11 is a schematic diagram showing a tire pressure sensing system in accordance with an embodiment of the present invention including multiple tire pressure information transmitters, a receiver capable of identifying the location of each tire and an indicator.

FIG. 11 shows a schematic diagram of a preferred tire pressure sensing system 80 of the present invention as mounted on a vehicle 81. The vehicle 81 includes a left-front tire 82, a right-front tire 83, a left-rear tire 84 and a right-rear tire 85. Each of the tires includes a switch assembly mounted thereon in accordance with the present invention. Thus, switch assemblies 86, 87, 88 and 89 are mounted on the tires 82, 83, 84 and 85, respectively. A test switch assembly 90 comprising a separate transmitter may optionally be mounted at a separate location on the vehicle 81 in order to verify that the system 80 is operating properly.

As shown in FIG. 11, a receiver 92 is mounted on the vehicle 81, and includes a series of antennae 93, 94, 95 and 96. The receiver 92 is connected to an indicator 98 which is preferably mounted in the interior of the vehicle 81. The antenna array 93, 94, 95, 96 is adapted to receive a low pressure signal from any of the switch assemblies 86, 87, 88 and 89. The low pressure signal is preferably a low power, pulsed radio frequency signal. Each of the switch assemblies 86, 87 and 88 and 89 is preferably capable of transmitting at substantially the same frequency.

As a particular example, upon sensing a low tire pressure in the left-front tire 82, the left-front switch assembly 86 transmits a pulsed signal A which is received by the antennae 93, 94, 95 and 96. In the embodiment of FIG. 11, the pulsed signal A from the switch assembly 86 is shown as being received by the left-front antenna 93 and the right-rear antenna 96. The receiver 92 compares the signals from the left-front antenna 93 and the right-rear antenna 96 to determine the phase difference and polarity of the signals. The receiver 92 determines a phase shift of the signals which is unique to the location of the left-front switch assembly 86.

As another example, if the right-rear tire 85 falls below a predetermined pressure level, the right-rear switch assembly 89 transmits a low power, pulsed signal B to the antennae 93, 94, 95 and 96. As shown in FIG. 11, the pulsed signal B which is received by the left-front antennae 93 and the right-rear antennae 96 may be compared by the receiver 92 to determine the phase difference and polarity of the signal received by each antenna. The receiver 92 thus determines a phase shift which is unique to the location of the right-rear switch assembly 89.

While the receiver 92 compares signals from two antennae 93 and 96 in the embodiment shown in FIG. 11, the phase difference and polarity determinations could be made from signals received from more than two antennae. Thus, a phase shift indicative of a particular sensor location may be established by using any of two or more antennae. Furthermore, while a square antenna array is schematically illustrated in FIG. 11, it is to be understood that other antenna array configurations may be used.

An indicator 98 is preferably mounted in the interior of the vehicle 81 for alerting the vehicle operator of the location of any tire that falls below a predetermined pressure level. The indicator 98 may include visual and/or audio means for alerting the driver. In a preferred embodiment, the indicator 98 provides a visual display comprising LED or other suitable light elements arranged in a pattern similar to the location of each wheel. For example, four LEDs may be arranged in a box pattern corresponding to the four tires of a typical four-wheel vehicle as shown in FIG. 11. Thus, if the left-front tire 82 loses pressure, the left-front LED lights up to indicate the low pressure condition of that tire. An audio signal may also be provided to further alert the vehicle operator of the low tire pressure.

In accordance with the present invention, a low tire pressure sensing system is provided which is capable of determining the location of a tire that has experienced pressure loss without the necessity of providing transmitters in each tire having a unique transmission frequency. In the preferred embodiment, each switch assembly is capable of transmitting essentially the same low power, pulsed signal when the tire pressure falls below the set point. Instead of relying upon a unique frequency transmitted by each sensor, the locating system of the present invention uses an antenna array to determine tire location. In this manner, the system automatically tracks the location of each tire without requiring the vehicle operator to remember which switch assembly has been mounted at which location on the vehicle.

While particular embodiments of the present invention have been described for the purposes of illustration herein, it will be understood by those skilled in the art that numerous variation of the details may be made without departing from the invention as described in the appended claims.

I claim:

1. A system for providing low tire pressure warning for a plurality of tires mounted at different locations on a vehicle, the system comprising:

means for transmitting tire pressure information at substantially the same frequency from the tires;

means for receiving the tire pressure information including means for automatically identifying the vehicle location of each tire on the vehicle independently of any change in mounting position of the tires on the vehicle; and means for indicating the tire pressure information and vehicle location information to an operator of the vehicle.

2. The system of claim 1, wherein the means for transmitting tire pressure information comprises a pressure responsive switch including:

a hermetically sealed pressure responsive bladder including an internal volume having a selected pressure level and at least one expansible surface;

a membrane switch including a resilient portion communicating with the expansible surface of the bladder; and electrical contact means communicating with the resilient portion of the membrane switch for establishing electrical contact to close the switch when pressure outside of the bladder falls below a predetermined level and the expansible surface of the bladder moves the resilient portion of the membrane switch from an open position to a closed position.

3. The system of claim 2, wherein the pressure responsive switch includes means for adjusting the pressure level of the internal volume of the hermetically sealed bladder.

4. The system of claim 2, wherein the pressure responsive switch includes a casing having a generally cylindrical interior volume, and the hermetically sealed pressure responsive bladder and membrane switch are axially aligned within the generally cylindrical interior volume.

5. The system of claim 4, wherein the pressure responsive switch includes a transmitter in electrical contact with the membrane switch, and a battery in electrical contact with the membrane switch and the transmitter, wherein the transmitter and battery are axially aligned with the hermetically sealed pressure responsive bladder and membrane switch within the generally cylindrical interior volume of the casing.

6. The system of claim 1, wherein the means for transmitting the tire pressure information comprises means for generating a pulsed signal from any of the tires when pressure in the tire falls below a predetermined level.

7. The system of claim 6, wherein the means for receiving the tire pressure information comprises a plurality of antennae for receiving the pulsed signal from the tire, and means for comparing the pulsed signal received by the antennae to determine a phase shift of the signal indicative of the location of the tire.

8. The system of claim 1, wherein the means for indicating the tire pressure information and vehicle location information to the operator comprises a visual display having light elements patterned to correspond to the vehicle location of each of the tires.

9. The system of claim 6, wherein the pulsed signal is a radio frequency signal.

10. The system of claim 9, wherein the means for transmitting the tire pressure information comprises means for generating the pulsed signal at substantially the same frequency from each of the tires.

11. A system for providing low tire pressure warning for a plurality of tires mounted at different locations on a vehicle, the system comprising:

means for transmitting tire pressure information from the tires;

means for receiving the tire pressure information including means for automatically identifying the vehicle location of each tire on the vehicle independently of any change in mounting position of the tires on the vehicle, wherein the means for receiving the tire pressure information comprises a plurality of antennae for receiving a pulsed signal from at least one of the tires, and means for comparing the pulsed signal to determine a phase shift of the signal indicative of the location of at least one tire; and means for indicating the tire pressure information and vehicle location information to an operator of the vehicle.

* * * * *